United States Patent
Qin et al.

(10) Patent No.: US 11,987,852 B2
(45) Date of Patent: May 21, 2024

(54) METHOD FOR CRYSTALLIZING COMPOUND SUGAR SOLUTION OF XYLOSE AND SUCROSE

(71) Applicant: ZHEJIANG HUAKANG PHARMACEUTICAL CO., LTD., Zhejiang (CN)

(72) Inventors: Shufang Qin, Quzhou (CN); Mian Li, Quzhou (CN); Qiang Wu, Quzhou (CN); Wulong Yang, Quzhou (CN); Huan Zhou, Quzhou (CN); Yinyin Liu, Quzhou (CN); Jiangen Yan, Quzhou (CN)

(73) Assignee: ZHEJIANG HUAKANG PHARMACEUTICAL CO., LTD, Quzhou (CN)

( * ) Notice: Subject to any disclaimer, the term of this patent is extended or adjusted under 35 U.S.C. 154(b) by 0 days.

(21) Appl. No.: 18/347,600

(22) Filed: Jul. 6, 2023

(65) Prior Publication Data
US 2023/0349012 A1 Nov. 2, 2023

Related U.S. Application Data

(63) Continuation of application No. PCT/CN2022/125222, filed on Oct. 13, 2022.

(30) Foreign Application Priority Data

Dec. 29, 2021 (CN) .......................... 202111641260.3

(51) Int. Cl.
*C13B 30/02* (2011.01)
(52) U.S. Cl.
CPC .................................... *C13B 30/02* (2013.01)
(58) Field of Classification Search
CPC ...................................................... C13B 30/02
USPC .......................................................... 127/58
See application file for complete search history.

(56) References Cited

U.S. PATENT DOCUMENTS 8,404,297 B2 * 3/2013 Arango Moreno ... C13B 50/004
426/548
2010/0034945 A1 2/2010 Arango Moreno

FOREIGN PATENT DOCUMENTS

| CN | 1563424 A | 1/2005 |
|---|---|---|
| CN | 1805969 A | 7/2006 |
| CN | 104046705 A | 9/2014 |
| CN | 104996970 A | 10/2015 |
| CN | 108618069 A | 10/2018 |
| CN | 111808999 A | 10/2020 |
| CN | 111850178 A | 10/2020 |
| CN | 112568422 A | 3/2021 |
| CN | 114231668 A | 3/2022 |
| WO | 2012164383 A1 | 12/2012 |
| WO | WO2020245399 | * 12/2020 |

OTHER PUBLICATIONS

Machine translation of WO2020/245399 downloaded on Sep. 21, 2023 (Year: 2020).*
International Search Report in PCT/CN2022/125222 dated Jan. 5, 2023, 10 pages.
Written Opinion in PCT/CN2022/125222 dated Jan. 5, 2023, 9 pages.
Wang, Hairong et al., Co-crystals and Co-crystallization of Meso-erythritol and Sucralose, Modern Food Science and Technology, 33(5): 228-232, 195, 2017.

* cited by examiner

*Primary Examiner* — Douglas B Call
(74) *Attorney, Agent, or Firm* — METIS IP LLC

(57) ABSTRACT

The embodiment of the present disclosure provides a method for crystallizing compound sugar solution of xylose and sucrose, including: introducing a mixed solution of sucrose crystals, xylose crystals and water into a crystallization device, setting a stirring speed in a range of 60 rpm-120 rpm, a temperature in a range of 75° C.-80° C., a vacuum pump pressure in a range of 50 mbar-200 mbar, evaporating the mixed solution until a Brix value of the mixed solution reaches a range of 78 Brix-81 Brix, and stopping the vacuum evaporation, adjusting the temperature to a range of 70° C.-75° C., dropwise adding food-grade isopropanol solution or ethanol solution to the evaporated mixed solution, adding sucrose seed crystals, and continuing stirring to obtain a solution, when small seed crystals grow in the solution, dropping the temperature to a range of 40° C.-60° C. at a rate of 10° C./h, and then stirring for 6 h to obtain the mixed sugar solution; centrifuging and drying at 40° C.-60° C. to obtain a finished product of the compound sugar crystals of the xylose and the sucrose. The obtained finished product has a complete crystal form similar to the sucrose and a sweetness similar to the sucrose and a uniform taste, which meets preferences of the consumers.

10 Claims, No Drawings

METHOD FOR CRYSTALLIZING COMPOUND SUGAR SOLUTION OF XYLOSE AND SUCROSE

CROSS-REFERENCE TO RELATED APPLICATION

This application is a Continuation of International Application No. PCT/CN2022/125222, filed on Oct. 13, 2022, which claims priority of Chinese Patent Application No. 202111641260.3, filed on Dec. 29, 2021, the contents of which are entirely incorporated herein by reference.

TECHNICAL FIELD

The present disclosure relates to the technical field of sugar alcohol application, and in particular to a method for crystallizing a compound sugar solution of xylose and sucrose.

BACKGROUND

Compared with other sweeteners, sucrose is widely used due to a higher sweetness preference. However, an absorption or overeating of the sucrose may cause health problems such elevated blood sugar, obesity, and dental caries, which violates a current consumption concept of people. Xylose is used as a new type of green additive due to low sweetness, low calories, and ability to proliferate intestinal probiotics, but an application of the xylose is limited due to poor flavor of the xylose.

A compound crystallization of the sucrose and the xylose may meet specific flavor requirements and calorie requirements, inhibit a function of a portion of invertase to reduce decomposition and absorption of the sucrose by a human body, reduce a glycemic index (GI) value of the sucrose in the human body, and reduce problems of obesity, dental caries, diabetes, etc. At present, most existing compound technologies of the sucrose and the xylose is to make the compound sugar of the mixed xylose and sucrose in a form of coating or spraying through a physical mixing method. However, the obtained products have problems such as uneven taste, a low hardness, layering caused by coating peeling off, etc., which seriously affect user experience.

Therefore, it is desired to provide a method for crystallizing a compound sugar solution of xylose and sucrose to improve the taste and quality of compound products of the sucrose and the xylose and enhance user experience.

SUMMARY

Some embodiments of the present disclosure provide a method for crystallizing a compound sugar solution of xylose and sucrose, the method includes the following operations: (a) weighing sucrose crystals and xylose crystals, adding deionized water to the sucrose crystals and the xylose crystals, stirring and dissolving to obtain a mixed solution; (b) introducing the mixed solution into a crystallization device, setting a stirring speed in a range of 60 rpm-120 rpm, a temperature in a range of 75° C.-80° C., and a vacuum pump pressure in a range of 50 mbar-200 mbar, turnining on a vacuum evaporation device, evaporating the mixed solution until a Brix value of the mixed solution reaches a range of 78 Brix-81 Brix, and stopping the vacuum evaporation to obtain an evaporated mixed solution; (c) adjusting the temperature to a range of 70° C.-75° C., adding food-grade isopropanol solution or ethanol solution dropwise to the evaporated mixed solution, adding sucrose seed crystals, and continuing stirring to obtain a solution; (d) when small seed crystals grow in the solution, dropping the temperature to a range of 40° C.-60° C. at a rate of 10° C./h, and then stirring for 6 h to obtain the compound sugar solution; and (e) centrifuging the compound sugar solution, and drying a centrifuged solid at the temperature in the range of 40° C.-60° C. to obtain a finished product of the compound sugar crystals of the xylose and the sucrose.

In some embodiments, the mass ratio of sucrose crystals and xylose crystals in operation (a) may be in a range of 2:1-6:1, and a mass of the deionized water may be 0.45-0.60 times of a total mass of the sucrose crystals and the xylose crystals.

In some embodiments, the stirring and dissolving in operation (a) includes heating at the temperature of 75° C.-80° C.

In some embodiments, a volume ratio of the evaporated mixed solution in operation (b) to the food-grade isopropanol solution or ethanol solution in operation (c) may be in a range of 1:1-3:1.

In some embodiments, a rate of adding the food-grade isopropanol solution or ethanol solution dropwise in operation (c) may be 1-2 drops/s.

In some embodiments, the mass of the sucrose seed crystals added in operation (c) accounts for 0.5%-2% of the mass of the sucrose crystals in operation (a).

In some embodiments, a particle diameter of the sucrose seed crystals may be 60 mesh or 80 mesh.

In some embodiments, a time for continuing stirring in operation (c) may be in a range of 1 h-4 h.

In some embodiments, a mass percentage of the xylose in the finished product of the compound sugar crystals in operation (e) may be in a range of 0.1%-5%.

DETAILED DESCRIPTION

In order to make the technical solutions and beneficial effects of the present disclosure clearer, the present disclosure will be further described in detail below in conjunction with the embodiments. It should be understood that the specific embodiments described here are only used to explain the present disclosure, not to limit the present disclosure.

One of the embodiments of the present disclosure provides a method for crystallizing a compound sugar solution of xylose and sucrose. The method includes the following operations.

Operation (a), weighing sucrose crystals and xylose crystals, adding deionized water to the sucrose crystals and the xylose crystals, stirring, and dissolving to obtain a mixed solution.

In some embodiments, a mass ratio of the sucrose crystals and the xylose crystals in operation (a) may be in a range of 2:1-6:1, and a mass of the deionized water may be 0.45-0.60 times of a total mass of the sucrose crystals and the xylose crystals.

In some embodiments, the mass ratio of the sucrose crystals to the xylose crystals may be in a range of 3:1-6:1. In some embodiments, the mass ratio of the sucrose crystals to the xylose crystals may be 5:1, 4:1, or 3:1.

In some embodiments, the mass of the deionized water may be 0.50-0.60 times of the total mass of sucrose crystals and xylose crystals. In some embodiments, the mass of the deionized water may be 0.50 times of the total mass of the sucrose crystals and the xylose crystals.

In some embodiments, the stirring and dissolving in operation (a) includes heating at a temperature in a range of 75° C.-80° C.

In some embodiments, a heating temperature for the stirring and the dissolving in operation (a) may be 75° C., 78° C., or 80° C.

Operation (b): introducing the mixed solution into a crystallization device, setting a stirring speed in a range of 60 rpm-120 rpm, a temperature in a range of 75° C.-80° C., and a vacuum pump pressure in a range of 50 mbar-200 mbar, turning on a vacuum evaporation device, evaporating the mixed solution until a Brix value of the mixed solution reaches a range of 78 Brix-81 Brix, and stopping the vacuum evaporation to obtain an evaporated mixed solution.

The Brix value is a unit of measuring a sugar content, indicating a mass of the sucrose dissolved in 100 g of aqueous solution. The Brix value of the sucrose solution may usually be measured by a polarimeter due to an optical activity of a sucrose aqueous solution. In some embodiments of the present disclosure, the Brix value reaching 78 Brix-81 Brix may be taken as a condition for the end of the evaporation.

Step (c): adjusting the temperature to a range of 70° C.-75° C., adding food-grade isopropanol solution or ethanol solution dropwise to an evaporated mixed solution, adding sucrose seed crystals, and continuing stirring to obtain a solution.

In some embodiments, a volume ratio of the evaporated mixed solution in operation (b) to the food-grade isopropanol solution or ethanol solution in operation (c) may be in a range of 1:1-3:1.

In some embodiments, the volume ratio of the evaporated mixed solution in operation (b) to the food-grade isopropanol solution or ethanol solution in operation (c) may be 1:1, 2:1, or 3:1.

In some embodiments, a rate of adding the food-grade isopropanol solution or ethanol solution dropwise in operation (c) may be 1-2 drops/s.

In some embodiments, the rate of adding the food-grade isopropanol solution or ethanol solution dropwise in operation (c) may be 1 drop/s or 2 drops/s.

In some embodiments, a mass of the sucrose seed crystals added in operation (c) may account for 0.5%-2% of the mass of the sucrose crystals in operation (a).

In some embodiments, the mass of the sucrose seed crystals added in operation (c) may account for 0.5%-1% of the mass of the sucrose crystals in operation (a). In some embodiments, the mass of the sucrose seed crystals added in operation (c) may account for 1%-2% of the mass of sucrose crystals in operation (a). In some embodiments, the mass of the sucrose seed crystals added in operation (c) may account for 0.5%, 1%, or 2% of the mass of the sucrose crystals in operation (a).

In some embodiments, a particle diameter of the sucrose seed crystals may be 60 mesh or 80 mesh.

In some embodiments, a time for continuing stirring in operation (c) may be in a range of 1-4 h.

In some embodiments, the time for continuing stirring in operation (c) may be 1 h, 2 h, or 4 h.

Operation (d): when small seed crystals grown in the solution, dropping the temperature to a range of 40° C.-60° C. at a rate of 10° C./h, and then stirring for 6 h to obtain the compound sugar solution.

Operation (e): centrifuging the compound sugar solution, and drying a centrifuged solid at the temperature in the range of 40° C.-60° C. to obtain a finished product of the compound sugar crystals of the xylose and the sucrose.

In some embodiments, a mass percentage of the xylose in the finished product of the compound sugar crystals in operation (e) may be in a range of 0.1%-5%.

In some embodiments, the mass percentage of the xylose in the finished product of the compound sugar crystals in operation (e) may be in a range of 0.1%-4%. In some embodiments, the mass percentage of the xylose in the finished product of the compound sugar crystals in operation (e) may be in a range of 0.1%-2%. In some embodiments, the mass percentage of the xylose in the finished product of the compound sugar crystals in operation (e) may be in a range of 2%-5%. In some embodiments, the mass percentage of the xylose in the finished product of the compound sugar crystals in operation (e) may be in a range of 2%-4%.

In some embodiments, the mass percentage of the xylose in the finished product of the compound sugar crystals in operation (e) may be 0.85%, 1.15%, 2.68%, or 4.63%.

In the embodiment of the present disclosure, a certain ratio of the sucrose crystals and the xylose crystals is dissolved in water and evaporated, when the Brix value of the sucrose solution reaches 78 Brix-81 Brix, the vacuum evaporation stops. By further controlling the ratio of the food-grade isopropanol solution or ethanol solution and sucrose seed crystals added to the evaporated mixed solution, as well as the crystallization and drying condition, the finished product of the compound sugar crystals of the xylose and the sucrose is obtained. The obtained finished product has a complete crystal form, and sweetness similar to the sucrose, a uniform taste, which meets the preferences of consumers.

The following examples are some more specific illustrations of the embodiments related to some of the above-mentioned embodiments. A portion of the content in these examples may also be replaced or combined with corresponding contents in other embodiments to form new embodiments. The experimental methods in the following examples are conventional methods unless otherwise specified. Experimental materials used in the following examples may be purchased from conventional biochemical reagent companies unless otherwise specified. Quantitative experiments in the following examples are all set up to repeat the experiments three times, and the results are averaged. It should be understood that the following examples are for better illustration the present disclosure, and not intended to limit the scope of the present disclosure.

Example 1

1. Weighing 33.6 g of xylose crystals and 168 g of sucrose crystals, then adding 110.8 g of deionized water to the sucrose crystals and the xylose crystals, stirring and dissolving at 80° C. to obtain a mixed solution.

2. Introducing the mixed solution into a crystallization device, setting a stirring speed in a range of 60 rpm-120 rpm, a temperature in a range of 75° C.-80° C., and a vacuum pump pressure in a range of 50 mbar-200 mbar, turning on a vacuum evaporation device, evaporating the mixed solution until a Brix value of the mixed solution reaches a range of 78 Brix-81 Brix, and stopping the vacuum evaporation to obtain an evaporated mixed solution.

3. Adjusting the temperature to a range of 70° C.-75° C., adding food-grade isopropanol solution or ethanol solution dropwise to the evaporated mixed solution, adding sucrose seed crystals, and continuing stirring for 1 h to obtain a solution.

4. When small seed crystals grow in the solution, dropping the temperature to a range of 40° C.-60° C. at a rate of 10° C./h, and then stirring for 6 h to obtain a compound sugar solution.

5. Centrifuging the compound sugar solution, and drying a centrifuged solid at the temperature in the range of 40° C.-60° C. to obtain a finished product of the compound sugar crystals of the xylose and the sucrose.

Example 2

1. Weighing 56 g of xylose crystals and 168 g of sucrose crystals, then adding 113.1 g of deionized water to the sucrose crystals and the xylose crystals, stirring and dissolving at 75° C. to obtain mixed solution.

2. Introducing the mixed solution into a crystallization device, setting a stirring speed at 120 rpm, a temperature at 80° C., and a vacuum pump pressure at 60 mbar, turning on a vacuum evaporation device, and evaporating the mixed solution until a Brix value of the mixed solution reaches 80 Brix, and stopping the vacuum evaporation to obtain evaporated mixed solution.

3. Adjusting the temperature to 70° C., adding food-grade isopropanol solution dropwise to the evaporated mixed solution at a rate of 1 drop/s, a volume ratio of the food-grade isopropanol solution to the evaporated mixed solution being 1:1, adding 0.86 g of the sucrose seed crystals with a particle diameter of 80 mesh, and continuing stirring for 1 h to obtain the solution.

4. When the small seed crystals grow in the solution, dropping the temperature to 40° C. at a rate of 10° C./h, and then stirring for 6 h to obtain compound sugar solution.

5. Centrifuging the compound sugar solution, and drying the centrifuged solid at 60° C. to obtain a finished product of the compound sugar crystals of the xylose crystals and the sucrose crystals, a mass percentage of the xylose in the finished product of the compound sugar crystals being 2.68%.

Example 3

1. Weighing 84 g of xylose crystals and 168 g of sucrose crystals, then adding 126 g of deionized water to the sucrose crystals and the xylose crystals, stirring and dissolving at 80° C. to obtain mixed solution.

2. Introducing the mixed solution into a crystallization device, setting a stirring speed at 115 rpm, a temperature at 78° C., and a vacuum pump pressure at 90 mbar, turning on a vacuum evaporation device, and evaporating the mixed solution until a Brix value of the mixed solution reaches 78 Brix, and stopping the vacuum evaporation to obtain evaporated mixed solution.

3. Adjusting the temperature to 70° C., adding food-grade isopropanol solution dropwise to the evaporated mixed solution at a rate of 2 drops/s, a volume ratio of the food-grade isopropanol solution to the evaporated mixed solution being 3:1, adding 0.86 g of sucrose seed crystals with a particle diameter of 80 mesh, and continuing stirring for 2 h to obtain the solution.

4. When the small seed crystals grow in the solution, dropping the temperature to 50° C. at a rate of 10° C./h, and then stirring for 6 h to obtain compound sugar solution.

5. Centrifuging the compound sugar solution, and drying the centrifuged solid at 40° C. to obtain a finished product of the compound sugar crystals of the xylose crystals and the sucrose crystals, a mass percentage of the xylose in the finished product of the compound sugar crystal product being 1.15%.

Example 4

1. Weighing 28 g of xylose crystals and 168 g of sucrose crystals, then adding 88.2 g of deionized water to the sucrose crystals and the xylose crystals, stirring and dissolving at 77° C. to obtain the mixed solution.

2. Introducing the mixed solution into a crystallization device, setting a stirring speed at 60 rpm, a temperature at 78° C., and a vacuum pump pressure at 200 mbar, turning on a vacuum evaporation device, and evaporating the mixed solution until a Brix value of the mixed solution reaches 81 Brix, and stopping the vacuum evaporation to obtain the evaporated mixed solution.

3. Adjusting the temperature to 75° C., adding food-grade isopropanol solution dropwise to the evaporated mixed solution at a rate of 2 drops/s, a volume ratio of the food-grade isopropanol solution to the evaporated mixed solution being 3:1, adding 3.36 g of the sucrose seed crystals with the particle diameter of 60 mesh, and continuing stirring for 4 h to obtain the solution.

4. When the small seed crystals grow in the solution, dropping the temperature to 60° C. at a rate of 10° C./h, and then stirring for 6 h to obtain compound sugar solution.

5. Centrifuging the compound sugar solution, and drying a centrifuged solid at the temperature in the range of 40° C.-60° C. to obtain a finished product of the compound sugar crystals of the xylose and the sucrose.

Example 5 Determination of a Xylose Content with Different Particle Diameters

The xylose content with different particle diameters may be determined by using a finished product of the compound sugar crystals of the xylose and the sucrose prepared in Example 1, and the results shown in Table 1 were obtained

TABLE 1

| determination of a xylose content | | | |
|---|---|---|---|
| | Particle diameter | | |
| | More than 20 mesh | 20 mesh- 30 mesh | Less than 30 mesh |
| Xylose content (%) | 2.66% | 2.65% | 2.70% |

The finished product of the compound sugar crystals of the xylose and the sucrose prepared by the method of the present disclosure has a uniform taste and no adverse situations such as layering and a different taste.

Example 6 Product Taste Test

The taste tests of the finished products of the compound sugar crystals of the xylose and the sucrose prepared in Examples 1-3 were carried out respectively for comparison with sucrose. Both the finished product of the compound sugar crystals of the xylose and the sucrose and the sucrose were prepared sugar solution with a concentration of 7%. A taste strength is divided into 7 grades: 1-very weak, 2-weak, 3-slightly weak, 4-average, 5-slightly strong, 6-strong, 7-very strong, and taste results were shown in Table 2.

TABLE 2

| | Product taste test results item | | | |
| --- | --- | --- | --- | --- |
| | sucrose | Example 1 | Example 2 | Example 3 |
| Sweetness | 5.3 | 5.1 | 4.9 | 5.3 |
| Bitterness | 1.7 | 2.1 | 2.2 | 2.1 |
| Metallic taste | 1 | 1.2 | 1.4 | 1.1 |
| Aftertaste sweetness | 2.5 | 2.3 | 2.1 | 2.5 |
| Aftertaste bitterness | 1.7 | 2.1 | 2.3 | 2.0 |
| Astringency | 1.9 | 2.5 | 3.0 | 2.2 |

The taste test results showed that the finished product of the compound sugar crystals of the xylose and the sucrose obtained by the method had taste similar to the sucrose, the sweetness close to the sucrose, and weak peculiar smell.

The above descriptions are only preferred embodiments of the present disclosure, and not intended to limit the scope of the present disclosure. Any modifications, equivalent replacements and improvements made within the spirit and principles of the present disclosure should be included in the protection scope of the present disclosure.

What is claimed is:

1. A method for crystallizing a compound sugar solution of xylose and sucrose, comprising:
   (a) weighing sucrose crystals and xylose crystals, mixing weighted sucrose crystals and weighted xylose crystals to obtain a mixture consisting of the sucrose crystals and the xylose crystals, adding deionized water to the mixture consisting of the sucrose crystals and the xylose crystals, stirring and dissolving at a temperature in a range of 75° C.-80° C. to obtain a mixed solution consisting of the sucrose and the xylose;
   (b) introducing the mixed solution into a crystallization device, setting a stirring speed in a range of 60 rpm-120 rpm, a temperature in a range of 75° C.- 80° C., and a vacuum pump pressure in a range of 50 mbar-200 mbar, turning on a vacuum evaporation device, evaporating the mixed solution until a Brix value of the mixed solution reaches a range of 78 Brix-81 Brix, and stopping the vacuum evaporation to obtain an evaporated mixed solution;
   (c) adjusting the temperature to a range of 70° C. -75° C., adding food-grade isopropanol solution or ethanol solution dropwise to the evaporated mixed solution, adding sucrose seed crystals, and continuing stirring to obtain a solution, wherein a mass of the sucrose seed crystals accounts for 0.5%-2% of a mass of the sucrose crystals in operation (a) and a particle diameter of the sucrose seed crystals is 60 mesh or 80 mesh;
   (d) when seed crystals grow in the solution, dropping the temperature to a range of 40° C.-60° C. at a rate of 10° C./h, and then stirring for 6 h to obtain the compound sugar solution; and
   (e) centrifuging the compound sugar solution, and drying a centrifuged solid at the temperature in the range of 40° C.-60° C. to obtain a finished product of the compound sugar crystals of the xylose and the sucrose.

2. The method of claim 1, wherein in the operation (a), a mass ratio of the sucrose crystals to the xylose crystals is in a range of 2:1-6:1, and a mass of the deionized water is 0.45-0.60 times of a total mass of the sucrose crystals and the xylose crystals.

3. The method of claim 1, wherein a volume ratio of the evaporated mixed solution in the operation (b) to the food-grade isopropanol solution or the ethanol solution in the operation (c) is in a range of 1:1-3:1.

4. The method of claim 1, wherein a rate of adding the food-grade isopropanol solution or the ethanol solution dropwise in the operation (c) is 1-2 drops/s.

5. The method of claim 1, wherein a time for the continuing stirring in the operation (c) is in a range of 1 h-4 h.

6. The method of claim 1, wherein a mass percentage of the xylose in the finished product of the compound sugar crystals in the operation (e) is in a range of 0.1%-5%.

7. The method of claim 1, comprising:
   weighing 33.6 g of the xylose crystals and 168 g of the sucrose crystals, mixing weighted sucrose crystals and weighted xylose crystals to obtain the mixture, then adding 110.8 g of the deionized water to the mixture, stirring and dissolving at 80° C. to obtain the mixed solution;
   introducing the mixed solution into the crystallization device, setting the stirring speed at 100 rpm, the temperature at 75° C., and the vacuum pump pressure at 50 mbar, turning on the vacuum evaporation device, evaporating the mixed solution until a brix value of the mixed solution reaches 79 Brix, and stopping the vacuum evaporation to obtain the evaporated mixed solution;
   adjusting the temperature to 70° C., adding the food-grade isopropanol solution dropwise to the evaporated mixed solution at a rate of 1 drop/s, the volume ratio of the food-grade isopropanol solution to the evaporated mixed solution being 1:1, adding 0.86 g of the sucrose seed crystals with a particle diameter of 80 mesh, and continuing stirring for 1 h to obtain the solution;
   when the small crystal seeds grow in the solution, dropping the temperature to 40° C. at a rate of 10° C./h, and then stirring for 6 h to obtain the compound sugar solution; and
   centrifuging the compound sugar solution, and drying the centrifuged solid at 60° C. to obtain the finished product of the compound sugar crystals of the xylose crystals and the sucrose crystals, wherein the mass percentage of the xylose in the finished product of the compound sugar crystals is 2.68%.

8. The method of claim 1, comprising:
   weighing 56 g of the xylose crystals and 168 g of the sucrose crystals, mixing weighted sucrose crystals and weighted xylose crystals to obtain the mixture, then adding 113.1 g of the deionized water to the mixture, stirring and dissolving at 75° C. to obtain the mixed solution;
   introducing the mixed solution into the crystallization device, setting the stirring speed at 120 rpm, the temperature at 80° C., and the vacuum pump pressure at 60 mbar, turning on the vacuum evaporation device, and evaporating the mixed solution until the Brix value of the mixed solution reaches 80 Brix, and stopping the vacuum evaporation to obtain the evaporated mixed solution;
   adjusting the temperature to 70° C., adding the food-grade ethanol solution dropwise to the evaporated mixed solution at the rate of 1 drop/s, the volume ratio of the food-grade ethanol solution to the evaporated mixed solution being 2:1, adding 0.86 g of the sucrose seed crystals with a particle size of 80 mesh, and continuing stirring for 1 h to obtain the solution;

when the small seed crystals grow in the solution, dropping the temperature to 45° C. at a rate of 10° C./h, and then stirring for 6 h to obtain the compound sugar solution; and centrifuging the compound sugar solution, and drying the centrifuged solid at 50° C. to obtain the finished product of the compound sugar crystals of the xylose crystals and the sucrose crystals, wherein the mass percentage of the xylose in the finished product of the compound sugar crystals is 4.63%.

9. The method of claim 1, comprising:

weighing 84 g of the xylose crystals and 168 g of the sucrose crystals, mixing weighted sucrose crystals and weighted xylose crystals to obtain the mixture, then adding 126 g of the deionized water to the mixture, stirring and dissolving at 80° C. to obtain the mixed solution;

introducing the mixed solution into the crystallization device, setting the stirring speed at 115 rpm, the temperature at 78° C., and the vacuum pump pressure at 90 mbar, turning on the vacuum evaporation device, and evaporating the mixed solution until the Brix value of the mixed solution reaches 78 Brix, and stopping the vacuum evaporation to obtain the evaporated mixed solution;

adjusting the temperature to 70° C., adding the food-grade isopropanol solution dropwise to the evaporated mixed solution at a rate of 2 drops/s, the volume ratio of the food-grade isopropanol solution to the evaporated mixed solution being 3:1, adding 0.86 g of the sucrose seed crystals with the particle size of 80 mesh, and continuing stirring for 2 h to obtain the solution;

when the small seed crystals grow in the solution, dropping the temperature to 50° C. at the rate of 10° C./h, and then stirring for 6 h to obtain the compound sugar solution; and centrifuging the compound sugar solution, and drying the centrifuged solid at 40° C. to obtain the finished product of the compound sugar crystals of the xylose crystals and the sucrose crystals, wherein the mass percentage of the xylose in the finished product of the compound sugar crystal product is 1.15%.

10. The method of claim 1, comprising:

weighing 28 g of the xylose crystals and 168 g of the sucrose crystals, mixing weighted sucrose crystals and weighted xylose crystals to obtain the mixture, then adding 88.2 g of the deionized water to the mixture, stirring and dissolving at 77° C. to obtain the mixed solution;

introducing the mixed solution into the crystallization device, setting the stirring speed at 60 rpm, the temperature at 78° C., and the vacuum pump pressure at 200 m bar, turning on the vacuum evaporation device, and evaporating the mixed solution until the Brix value of the mixed solution reaches 81 Brix, and stopping the vacuum evaporation to obtain the evaporated mixed solution;

adjusting the temperature to 75° C., adding the food-grade isopropanol solution dropwise to the evaporated mixed solution at a rate of 2 drops/s, the volume ratio of the food-grade isopropanol solution to the evaporated mixed solution being 3:1, adding 3.36 g of the sucrose seed crystals with the particle size of 60 mesh, and continuing stirring for 4 h to obtain the solution;

when the small seed crystals grow in the solution, dropping the temperature to 60° C. at the rate of 10° C./h, and then stirring for 6 h to obtain the compound sugar solution; and centrifuging the compound sugar solution, and drying the centrifuged solid at 40° C. to obtain the finished product of the compound sugar crystals of the xylose crystals and the sucrose crystals, wherein the mass percentage of the xylose in the finished product of the compound sugar crystal product is 1.15%.

* * * * *